United States Patent
Bacher et al.

(10) Patent No.: US 9,128,966 B2
(45) Date of Patent: *Sep. 8, 2015

(54) DETERMINING A STORAGE LOCATION BASED ON FREQUENCY OF USE

(71) Applicant: International Business Machines Corporation, Armonk, NY (US)

(72) Inventors: Utz Bacher, Weil im Schoenbuch (DE); Akshay V. Rao, Wood-Ridge, NJ (US); Thomas Spatzier, Holzerlinen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,982

(22) Filed: Oct. 4, 2013

(65) Prior Publication Data

US 2014/0032618 A1    Jan. 30, 2014

Related U.S. Application Data

(63) Continuation of application No. 12/645,977, filed on Dec. 23, 2009, now Pat. No. 8,589,356.

(51) Int. Cl.
*G06F 17/30*    (2006.01)

(52) U.S. Cl.
CPC .... *G06F 17/30312* (2013.01); *G06F 17/30221* (2013.01)

(58) Field of Classification Search
CPC ............... G06F 17/30312; G06F 17/30221
USPC ................................ 707/663, 662, 672, 812
See application file for complete search history.

(56) References Cited

U.S. PATENT DOCUMENTS 5,822,759 A * 10/1998 Treynor ..................... 711/134
6,199,074 B1    3/2001 Kern et al.
(Continued)

FOREIGN PATENT DOCUMENTS

JP            8161123 A     6/1996
JP            9319625 A    12/1997

OTHER PUBLICATIONS

Rahman et al., "Replica Selection in Grid Environment: A Data-Mining Approach", Mar. 2005, pp. 695-700, ACM Symposium on Applied Computing.
(Continued)

*Primary Examiner* — Jorge A Casanova
(74) *Attorney, Agent, or Firm* — Dan Simek; Hoffman Warnick LLC

(57) ABSTRACT

Aspects provide a method of determining a storage location for a data item, including providing first and second data storage locations, the first location having an appreciably faster access speed than the second, the data storage locations are primary storage locations providing persistent storage, accessing a score associated with the data item, the score being calculated based on a frequency of access; and selecting only one of the storage locations based on the score with respect to other data scores, wherein the data item is stored in only one of the storage locations at any time, re-calculating the scores, wherein the score is accessed from a score table of data items; and in response to re-calculating of the scores, causing a change in the selection of the data storage location, removing the data item from a current storage location and adding the data item to a newly selected storage location.

20 Claims, 4 Drawing Sheets

(56) References Cited

U.S. PATENT DOCUMENTS

| | | | |
|---|---|---|---|
| 6,324,620 B1 | 11/2001 | Christenson et al. | |
| 6,693,869 B1 | 2/2004 | Ballantyne | |
| 7,146,389 B2 | 12/2006 | Ebata et al. | |
| 2002/0107835 A1* | 8/2002 | Coram et al. | 707/1 |
| 2009/0265517 A1* | 10/2009 | Sinclair | 711/161 |

OTHER PUBLICATIONS

Gerndt et al, "Viracocha: An Efficient Parallelization Framework for Large-Scale CFD Post-Processing in Virtual Environments", 20004, 12 pages, IEEE.

Jing et al., "Client-Server Computing in Mobile Environments", Jun. 1999, pp. 117-157, ACM Computing Surveys, vol. 31, No. 2.

U.S. Appl. No. 12/645,977, filed Dec. 23, 2009, Office Action dated Jan. 15, 2013.

U.S. Appl. No. 12/645,977, filed Dec. 23, 2009, Office Action dated May 29, 2012.

U.S. Appl. No. 12/645,977, filed Dec. 23, 2009, Office Action dated Dec. 20, 2011.

U.S. Appl. No. 12/645,977, filed Dec. 23, 2009, Office Action dated May 28, 2013.

U.S. Appl. No. 12/645,977, filed Dec. 23, 2009, Notice of Allowance dated Jul. 11, 2013.

* cited by examiner

Score Table 100

| File Identifier | File Size | Score | Calculation Time | Location Identifier |
|---|---|---|---|---|
| Data Item 1 34A | 25 | 250 | 2009/11/01 | first |
| Data Item 2 34B | 105 | 200 | 2009/11/05 | first |
| Data Item 3 34C | 70 | 150 | 2009/10/01 | second |
| Data Item 4 34D | 850 | 50 | 2009/10/15 | second |

FIG. 2

Score Table 110

| File Identifier | File Size | Score | Calculation Time | Location Identifier |
|---|---|---|---|---|
| Data Item 1 34A | 25 | 250 | 2009/11/01 | first |
| Data Item 2 34B | 105 | 200 | 2009/11/10 | first |
| Data Item 3 34C | 50 | 300 | 2009/11/20 | second |
| Data Item 4 34D | 850 | 50 | 2009/10/15 | second |

FIG. 3

Score Table 120

| File Identifier | File Size | Score | Calculation Time | Location Identifier |
|---|---|---|---|---|
| Data Item 3 <u>34C</u> | 50 | 300 | 2009/11/21 | first |
| Data Item 2 <u>34B</u> | 105 | 190 | 2009/11/21 | first |
| Data Item 1 <u>34A</u> | 25 | 180 | 2009/11/21 | second |
| Data Item 4 <u>34D</u> | 850 | 40 | 2009/11/21 | second |

FIG. 4

DETERMINING A STORAGE LOCATION BASED ON FREQUENCY OF USE

CROSS REFERENCE TO RELATED APPLICATIONS

This application is a continuation of co-pending U.S. patent application Ser. No. 12/645,977, filed on Dec. 23, 2009, which received a Notice of Allowance on Jul. 11, 2013

FIELD

The disclosure relates generally to data storage, and more particularly, to persistent storage of data items based on frequency of use.

BACKGROUND ART

In the field of information technology, storage and retrieval of data plays a big part. This is because, in part, peripheral devices, such as storage systems, are often slower than the processing components of a computer by orders of magnitude. Because of this, increasing the speed that data is stored and accessed can yield large dividends with respect to increasing the speed of the system as a whole.

Storage systems may often vary widely from system to system. However, often different locations within a storage system have different speeds for storage and retrieval of data. Many systems in the art fail to recognize these different locations as an opportunity for improving performance. Further, in systems that do attempt to utilize the different locations, the resulting systems often rely on external software applications and/or user defined parameters.

SUMMARY OF THE INVENTION

Aspects of the invention provide a solution for determining a storage location for a data item from among a set of persistent storage locations having varying access speeds. Each data item is associated with a score that is based on the frequency with which the data item has been accessed, as well as possible other factors, such as open time and/or close time of the data item, the amount of data in the data item, the period from the last time the data item was closed to the next time that the data item is opened and/or the total amount of data in the data item. Data items with high scores relative to other data items are assigned to faster access storage location while data items with lower scores are assigned to slower access storage locations.

A first aspect of the invention provides a computer-implemented method of determining a storage location for a data item, the method comprising: providing a first data storage location and a second data storage location, the first data storage location having a faster access speed than the second data storage location, wherein the first and second data storage locations provide persistent storage; accessing a score associated with the data item, the score being calculated by a computer device based on a frequency of access of the data item; and selecting one of the first data storage location or the second data storage location based on a value of the score associated with the data item with respect to scores of other data items being stored.

A second aspect of the invention provides a computer system for determining a storage location for a data item, the computer system comprising: at least one computer device configured to determine a storage location for a data item by: providing a first data storage location and a second data storage location, the first data storage location having a faster access speed than the second data storage location, wherein the first and second data storage locations provide persistent storage; accessing a score associated with the data item, the score being calculated by a computer device based on a frequency of access of the data item; and selecting one of the first data storage location or the second data storage location based on a value of the score associated with the data item with respect to scores of other data items being stored.

A third aspect of the invention provides a computer program comprising program code embodied in at least one computer-readable medium, which when executed, enables a computer system to implement a method of determining a storage location for a data item, the method comprising: providing a first data storage location and a second data storage location, the first data storage location having a faster access speed than the second data storage location, wherein the first and second data storage locations provide persistent storage; accessing a score associated with the data item, the score being calculated by a computer device based on a frequency of access of the data item; and selecting one of the first data storage location or the second data storage location based on a value of the score associated with the data item with respect to scores of other data items being stored.

A fourth aspect of the invention provides a method of generating a computer system for determining a storage location for a data item, the method comprising: providing a computer system operable to: provide a first data storage location and a second data storage location, the first data storage location having a faster access speed than the second data storage location, wherein the first and second data storage locations provide persistent storage; access a score associated with the data item, the score being calculated by a computer device based on a frequency of access of the data item; and select one of the first data storage location or the second data storage location based on a value of the score associated with the data item with respect to scores of other data items being stored.

A fifth aspect of the invention provides a method comprising: at least one of providing or receiving a copy of a computer program that is encoded in a set of data signals, wherein the computer program enables a computer system to implement a method of determining a storage location for a data item, the method comprising: providing a first data storage location and a second data storage location, the first data storage location having a faster access speed than the second data storage location, wherein the first and second data storage locations provide persistent storage; accessing a score associated with the data item, the score being calculated by a computer device based on a frequency of access of the data item; and selecting one of the first data storage location or the second data storage location based on a value of the score associated with the data item with respect to scores of other data items being stored.

A sixth aspect of the invention provides a computer-implemented method of determining a storage location for a data item, the method comprising: providing a first data storage location and a second data storage location, the first data storage location having an appreciably faster access speed than the second data storage location, wherein the first and second data storage locations are primary storage locations that provide persistent storage; accessing a score associated with the data item, the score being calculated by a computer device based on a frequency of access of the data item; and selecting only one of the first data storage location or the second data storage location based on a value of the score associated with the data item with respect to scores of other data items being stored, wherein the data item is stored in only one of the first data storage location or the second data storage location at any point in time; periodically re-calculating the scores associated with the data items in a table, wherein the score is accessed from a score table of data items; and in response to the re-calculating of the scores, causing a change in the selecting of the one of the first data storage location or the second data storage location, removing the data item from a current storage location and adding the data item to a newly selected storage location.

A seventh aspect of the invention provides a computer system for determining a storage location for a data item, the computer system comprising: at least one computer device having a processor and a memory and being configured to determine a storage location for a data item by: providing a first data storage location and a second data storage location, the first data storage location having an appreciably faster access speed than the second data storage location, wherein the first and second data storage locations are primary storage locations that provide persistent storage; accessing a score associated with the data item, the score being calculated by a computer device based on a frequency of access of the data item; and selecting only one of the first data storage location or the second data storage location based on a value of the score associated with the data item with respect to scores of other data items being stored, wherein the data item is stored in only one of the first data storage location or the second data storage location at any point in time; periodically re-calculating the scores associated with the data items in a table, wherein the score is accessed from a score table of data items; and in response to the re-calculating of the scores, causing a change in the selecting of the one of the first data storage location or the second data storage location, removing the data item from a current storage location and adding the data item to a newly selected storage location.

An eighth aspect of the invention provides a computer program comprising program code embodied in at least one computer-readable storage medium, which when executed, enables a computer system to implement a method of determining a storage location for a data item, the method comprising: providing a first data storage location and a second data storage location, the first data storage location having an appreciably faster access speed than the second data storage location, wherein the first and second data storage locations are primary storage locations that provide persistent storage; accessing a score associated with the data item, the score being calculated by a computer device based on a frequency of access of the data item; and selecting only one of the first data storage location or the second data storage location based on a value of the score associated with the data item with respect to scores of other data items being stored, wherein the data item is stored in only one of the first data storage location or the second data storage location at any point in time; periodically re-calculating the scores associated with the data items in a table, wherein the score is accessed from a score table of data items; and in response to the re-calculating of the scores, causing a change in the selecting of the one of the first data storage location or the second data storage location, removing the data item from a current storage location and adding the data item to a newly selected storage location.

A ninth aspect of the invention provides a method of generating a computer system for determining a storage location for a data item, the method comprising: providing a computer system operable to: provide a first data storage location and a second data storage location, the first data storage location having an appreciably faster access speed than the second data storage location, wherein the first and second data storage locations are primary storage locations that provide persistent storage; access a score associated with the data item, the score being calculated by a computer device based on a frequency of access of the data item; and select only one of the first data storage location or the second data storage location based on a value of the score associated with the data item with respect to scores of other data items being stored, wherein the data item is stored in only one of the first data storage location or the second data storage location at any point in time; periodically re-calculate the scores associated with the data items in a table, wherein the score is accessed from a score table of data items; and in response to the re-calculating of the scores, cause a change in the selecting of the one of the first data storage location or the second data storage location, removing the data item from a current storage location and adding the data item to a newly selected storage location.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 2 shows a scoring table according to an embodiment of the present invention.

FIG. 3 shows an updated scoring table according to an embodiment of the present invention.

FIG. 4 shows an updated scoring table according to an embodiment of the present invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
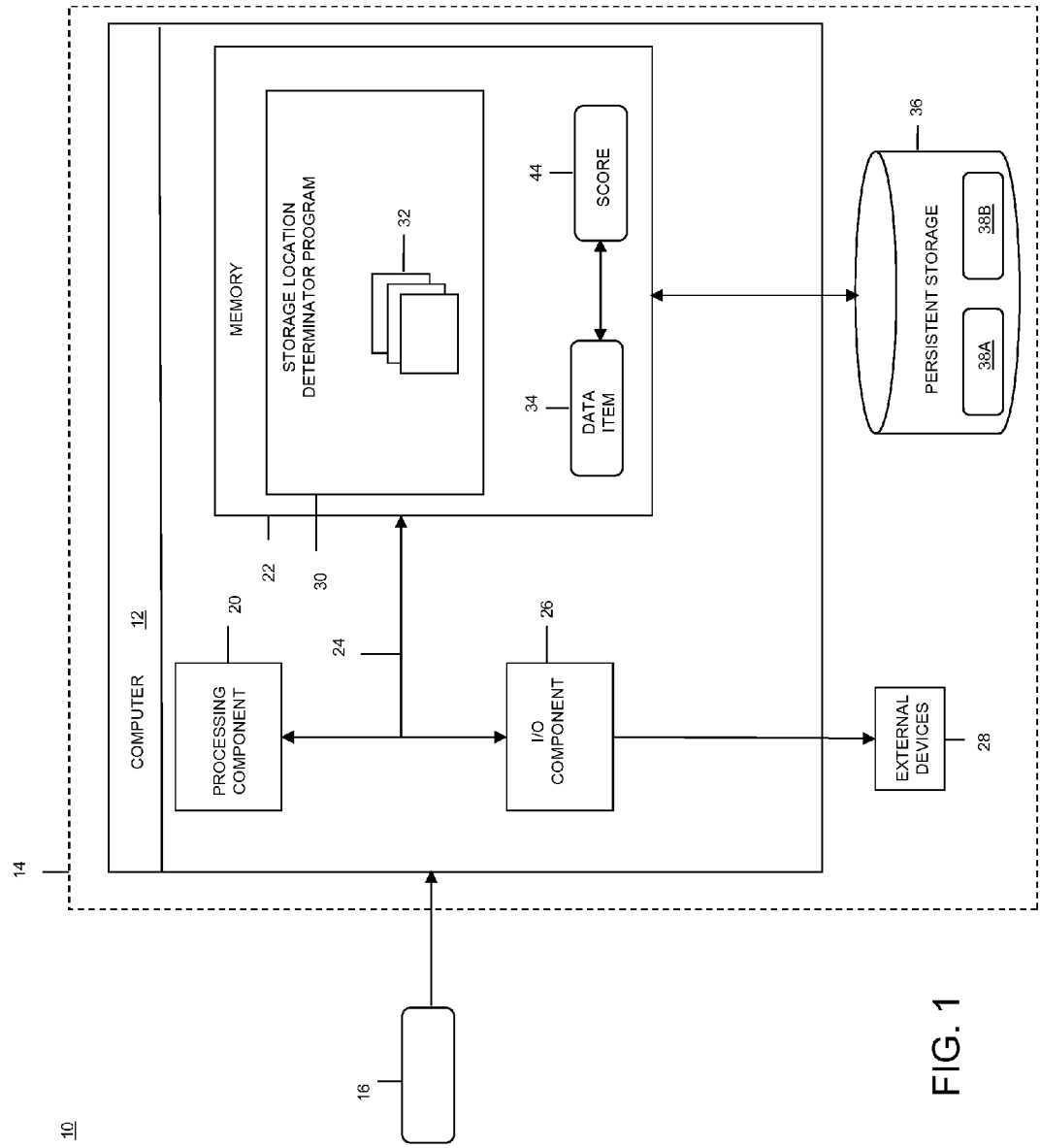
FIG. 1 shows an illustrative computer infrastructure determining a storage location for a data item according to an embodiment of the present invention.

As indicated above, aspects of the invention provide a solution for determining a storage location for a data item from among a set of persistent storage locations having varying access speeds. Each data item is associated with a score that is based on the frequency with which the data item has been accessed, as well as possible other factors such as open time and/or close time of the data item, the amount of data in the data item, the period from the last time the data item was closed to the next time that the data item is opened and/or the total amount of data in the data item. Data items with high scores relative to other data items are assigned to faster access storage location while data items with lower scores are assigned to slower access storage locations. As used herein, unless otherwise noted, the term "set" means one or more (i.e., at least one) and the phrase "any solution" means any now known or later developed solution.

Turning to the drawings, FIG. 1 shows an illustrative environment 10 for determining a storage location for a data item 34 according to an embodiment. To this extent, environment 10 includes a computer system 12 deployed within a computer infrastructure 14 that can perform a process described herein in order to determine a storage location for data item 34. In particular, computer system 12 is shown including a storage location determinator program 30, which makes computer system 12 operable to determine a storage location for data item 34 by performing a process described herein.

Computer system 12 is shown including a processing component 20 (e.g., one or more processors), a storage component 22 (e.g., a storage hierarchy), an input/output (I/O) component 26 (e.g., one or more I/O interfaces), and a communications pathway 24. Further, computer system 12 is shown in communication with external I/O devices/resources 28 and persistent storage 36. In general, processing component 20 executes program code, such as storage location determinator program 30, which is at least partially fixed in storage component 22. While executing program code, processing component 20 can process data, which can result in reading and/or writing transformed data from/to storage component 22 and/or I/O component 26 for further processing. Pathway 24 provides a communications link between each of the components in computer system 12. I/O component 26 can comprise one or more human I/O devices, which enable a human user 16 to interact with computer system 12 and/or one or more communications devices to enable a system user 16 to communicate with computer system 12 using any type of communications link. To this extent, storage location determinator program 30 can manage a set of interfaces (e.g., graphical user interface(s), application program interface, and/or the like) that enable human and/or system users 16 to interact with storage location determinator program 30. Further, storage location determinator program 30 can manage (e.g., store, retrieve, create, manipulate, organize, present, etc.) the data, such as data item 34, using any solution.

In any event, computer system 12 can comprise one or more general purpose computing articles of manufacture (e.g., computing devices) capable of executing program code, such as storage location determinator program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, storage location determinator program 30 can be embodied as any combination of system software and/or application software.

Further, storage location determinator program 30 can be implemented using a set of modules 32. In this case, a module 32 can enable computer system 12 to perform a set of tasks used by storage location determinator program 30, and can be separately developed and/or implemented apart from other portions of storage locator determinator program 30. As used herein, the term "component" means any configuration of hardware, with or without software, which implements the functionality described in conjunction therewith using any solution, while the term "module" means program code that enables a computer system 12 to implement the actions described in conjunction therewith using any solution. When fixed in a storage component 22 of a computer system 12 that includes a processing component 20, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 12.

When computer system 12 comprises multiple computing devices, each computing device can have only a portion of storage location determinator program 30 fixed thereon (e.g., one or more modules 32). However, it is understood that computer system 12 and storage location determinator program 30 are only representative of various possible equivalent computer systems that may perform a process described herein. To this extent, in other embodiments, the functionality provided by computer system 12 and storage location determinator program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 12 includes multiple computing devices, the computing devices can communicate over any type of communications link. Further, while performing a process described herein, computer system 12 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, storage location determinator program 30 enables computer system 12 to determine a storage location for data item 34. To this extent, storage location determinator program 30 utilizes a first data storage location 38A and a second data storage location 38B within persistent storage 36. First data storage location 38A has an access speed that is faster than that of second data storage location 38B. To this extent, first data storage location 38A and second data storage location 38B may be distinct portions of a single storage device within persistent storage 36. In the alternative, first data storage location 38A may reside in a storage device that is distinct and/or separate from that of second data storage location 38B. As such, either or both of first data storage location 38A or second data storage location 38B may be embodied within a hard disk, floppy disk, flash memory, tape drive and/or any other device or apparatus that is known in the art to be used for persistent data storage.

In any case, storage location determinator program 30 selects which of first data storage location 38A or second data storage location 38B data item 34 should be stored in. To accomplish this goal, storage location determinator program 30 accesses a score 44 associated with data item 34. Score 44 may be stored in metadata associated with data item 34 and may be calculated/updated by the operating system of computer 12 at various points in time, including, but not limited to: when data item 34 is accessed, when data item 34 ceases to be accessed, when data item 34 is stored and/or periodically as determined by the operating system. To facilitate this calculation, a timestamp that indicates the last time that score 44 was updated may also be stored in the metadata.

To this extent, score 44 provides way to prioritize data item 34 with respect to other data items based on how frequently data item 34 is accessed. As such, score 44 may be calculated by the operating system of computer 12 using some or all factors including, but not limited to:

open time and/or close time of data item 34—a greater amount of time that data item 34 remains open would lead to a higher value for score 44;

the amount of data in data item 34 that is accessed (e.g., read and/or written) with respect to the total amount of data in data item 34—this information may be retrieved from the file inode in the operation system kernel and used to update the score to reflect the amount of file access activity. This factor could be used to estimate the importance of data item 34, and, as a result the benefit that would be gained from moving the data item to a different data storage location. A large data item 34 that has only a small amount accessed would have a lower value for score 44. In contrast, a greater amount of data accessed per activity would lead to a higher value for score 44;

the period from the last time that data item 34 was closed to the next time that data item 34 is opened—a shorter amount of time between accesses would lead to a higher value for score 44;

the total amount of data in data item 34—a smaller amount of data would lead to a higher value for score 44; and the type of data contained in data item 34—some types of data, such as audio or video may be determined not to have a need for faster access. As such, files such as these may be exempt from scoring or may have a score that remains low, ensuring that these files are maintained in second data storage location 38B.

To this extent, score 44 for a particular data item 34 is a value that reflects a number of factors that indicate a relative value of a data item 34 within the system. The value of score 34 may be calculated during file operations (e.g., read, write, open, close etc). In the alternative, score 44, may be calculated as an optimization only during some file operations. In any case, the operating system has an inode (or in general, the metadata) for a data item 34, such as a file. This inode is available during file operation, so there is minimal performance impact when calculating and storing score 44 for a particular data item 34 at that time. Furthermore, calculation of score 44 at the time of access enables score 44 for a particular data item 34 to be calculated without regard to other data items 34 at that time. Rather, it is sufficient to evaluate one data item 34 in isolation and not need to evaluate other data items 34. Comparison, between data items 34 may then be done by a periodic task that is performed after a configurable amount of time has elapsed, in conjunction with a fading, which will be further described hereafter. Furthermore, the fading that is performed during this periodic task also allows the calculations of score performed on individual data items 34 to be taken into account, by weighing scores 44 for different data items 34 against each.

Turning now to FIG. 2, a score table 100 in accordance with an embodiment of the present invention is shown. Score table 100 provides the operating system of computer system 12 with a way to access and update scores 44 associated with data items 34A-D. As shown, score table 100 includes an identifier for each data item 34A-D, a size of data item 34A-D, a score 44 associated with data item 34A-D, a time at which score 44 was calculated and an identifier that indicates which of first data storage location 38A or second data storage location 38B currently stores each data item 34A-D. Even though, as illustrated the time is shown as only indicating a date, it should be recognized by those skilled in the art that any measurement of time now known or later discovered may be used, including, but not limited to date, date and time, elapsed time, etc. Score table 100 may comprise a single list that includes all data items 34 or multiple lists of data items in the system for which storage is desired. In the alternative, score table may omit certain data items 34, which may be allocated to one of first data storage location 38A or second data storage location 38B by default. Still further, score table 100 may include one or more lists of only data items 34 that are eligible for promotion or designated for relegation/demotion, e.g., for which score 44 has recently changed.

In any case, score table 100, allows storage location determinator program 30 to maintain scores 44 associated with data items 34A-D in such a way that a data storage location 38A-B may be selected for data items 34A-D by the operating system. This selection is based on the value of the score 44 associated with a particular data item 34A-D, with respect to scores 44 associated with the other data items 34A-D. For example, as illustrated data item 1 34A and data item 2 34B each have scores 44 that are higher than those of data item 3 34C and data item 4 34D. As such, data item 1 34A and data item 2 34B are both assigned to first data storage location 38A, while data item 3 34C and data item 4 34D are both assigned to second data storage location 38B. Although illustrated as being sorted by score 44, it should be understood that any solution for sorting and/or data access now known or later developed in the art could be used, including, but not limited to sorting by a field other than score 44, sorting in a different order, indexing, etc.

Turning now to FIG. 3, a score table 110 in accordance with an embodiment of the present invention is shown. As illustrated, details associated with data item 3 34C have changed. For example, data item 3 34C has been accessed one or more times, and the file size has decreased from 70 (FIG. 2) to 50. As a result of the access, change in file size and/or a fading factor based on the calculation time of the previous update, score 44 associated with data item 3 34C has been recalculated/updated by the operating system to reflect the changes. Specifically, score 44 has increased from 150 to 300, making it the highest score 44. However, in this embodiment, data item 3 34C is still assigned to second data location 38B, even though score 44 associated with data item 3 34C is has a value that is higher than scores associated with data item 1 34A and data item 2 34B. Although, as illustrated, the data location has not changed in response to the update, it should be understood that in an alternative embodiment, the new first data location 38A could be selected for data item 3 34C at the time that score 44 associated therewith is calculated.

Looking now at FIG. 4, another score table 120 resulting from a periodic recalculation/update of some or all of scores 44 in accordance with an embodiment of the present invention is shown. This periodic recalculation of scores 44 associated with data items 34A-C in score table 120 is performed by fading scores 44 based on a period of time having elapsed since a previous access of the data item. Specifically, a certain amount may be deducted from a particular score based on how much time has elapsed since the calculation time shown in table 120. As illustrated, scores 44 associated with each data item 34A-D have been recalculated. As the calculation time (FIG. 3) associated with data item 3 34C is only one day previous from that of the periodic recalculation, the score associated with data item 3 34C has not changed. However, since data item 1 34A had a calculation time (FIG. 3) that was prior to that of data item 2 34B, score 44 associated with data item 1 34A has undergone a greater fading than has score 44 associated with data item 2 34B. As a result, the new first data location 38A has been selected for data item 3 34C based on score 44 calculated for data item 3 34C at the time of the previous access. Furthermore, the new first data location 38A has been selected for data item 2 34B and data item 1 has been moved to second data location 38B based on the access time based fading.

In any event, computer system 12 can obtain data item 34 using any solution. For example, computer system 12 can generate and/or be used to generate data item 34, retrieve data item 34 from one or more data stores, receive data item 34 from another system, and/or the like. Whatever the case, storage location determinator program 30 allows the operating system of computer system 12 to manage storage of data items 34 in persistent storage 36. This management is done autonomically by the operating system. No external management application programs are required. In addition, the algorithms used to calculate scores 44 are operating system based, meaning that a user does not have to manage settings associated with storage location determinator program 30 and/or the algorithm.

While shown and described herein as a method and system for determining a storage location for a data item, it is understood that aspects of the invention further provide various alternative embodiments. For example, in one embodiment, the invention provides a computer program fixed in at least one computer-readable medium, which when executed, enables a computer system to determine a storage location for a data item. To this extent, the computer-readable medium includes program code, such as storage location determinator program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as storage location determinator program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for determining a storage location for a data item. In this case, a computer system, such as computer system 12 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to determine a storage location for a data item as described herein. In this case, the service provider can manage (e.g., create, maintain, support, etc.) a computer system, such as computer system 12 (FIG. 1), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of determining a storage location for a data item, the method comprising:

providing a first data storage location and a second data storage location, the first data storage location having an appreciably faster access speed than the second data storage location, wherein the first and second data storage locations are primary storage locations that provide persistent storage;

accessing a score associated with the data item, the score being calculated by a computer device based on a frequency of access of the data item;

selecting only one of the first data storage location or the second data storage location based on a value of the score associated with the data item with respect to scores of other data items being stored, wherein the data item is stored in only one of the first data storage location or the second data storage location at any point in time;

periodically re-calculating the scores associated with the data items in a table, wherein the score is accessed from a score table of data items; and in response to the re-calculating of the scores, causing a change in the selecting of the one of the first data storage location or the second data storage location, removing the data item from a current storage location and adding the removed data item to a newly selected storage location.

2. The computer-implemented method of claim 1, further comprising a second data item having a second data score that is lower than the score of the data item, wherein the selecting selects the first data storage location for the data item and the second data storage location for the second data item.

3. The computer-implemented method of claim 1, wherein the score is further calculated based on at least one of: an amount of time that a data item remains open, a size of the data item, a percentage of the data item that is accessed or a type of data in the data item.

4. The computer-implemented method of claim 1, wherein the score table of data items includes an identifier of the data item, a size of the data item, the score, a timestamp indicating when the score was calculated and an identifier that indicates whether the data item is currently stored on the first data storage location or the second data storage location.

5. The computer-implemented method of claim 4, wherein the periodically re-calculating of the scores associated with the data items in the table is performed by diminishing the score of each of the data items by different amounts that are based on a period of time having elapsed for each of the data items since a previous access of a particular data item.

6. The computer-implemented method of claim 1, wherein the re-calculating of the scores is performed in response to the data item being accessed.

7. A computer system for determining a storage location for a data item, the computer system comprising:
- at least one computer device having a processor and a memory and being configured to determine a storage location for a data item by:
- providing a first data storage location and a second data storage location, the first data storage location having an appreciably faster access speed than the second data storage location, wherein the first and second data storage locations are primary storage locations that provide persistent storage;
- accessing a score associated with the data item, the score being calculated by a computer device based on a frequency of access of the data item;
- selecting only one of the first data storage location or the second data storage location based on a value of the score associated with the data item with respect to scores of other data items being stored, wherein the data item is stored in only one of the first data storage location or the second data storage location at any point in time;
- periodically re-calculating the scores associated with the data items in a table, wherein the score is accessed from a score table of data items; and
- in response to the re-calculating of the scores, causing a change in the selecting of the one of the first data storage location or the second data storage location, removing the data item from a current storage location and adding the removed data item to a newly selected storage location.

8. The computer system of claim 7, further comprising a second data item having a second data score that is lower than the score of the data item, wherein the selecting selects the first data storage location for the data item and the second data storage location for the second data item.

9. The computer system of claim 7, wherein the score is further calculated based on at least one of: an amount of time that a data item remains open, a size of the data item, a percentage of the data item that is accessed or a type of data in the data item.

10. The computer system of claim 7, wherein the score table of data items includes an identifier of the data item, a size of the data item, the score, a timestamp indicating when the score was calculated and an identifier that indicates whether the data item is currently stored on the first data storage location or the second data storage location.

11. The computer system of claim 10, wherein the periodically re-calculating of the scores associated with the data items in the table is performed by diminishing the score of each of the data items by different amounts that are based on a period of time having elapsed for each of the data items since a previous access of a particular data item.

12. The computer system of claim 7, wherein the re-calculating of the scores is performed in response to the data item being accessed.

13. A computer program comprising program code embodied in at least one non-transitory computer-readable storage medium, which when executed, enables a computer system to implement a method of determining a storage location for a data item, the method comprising:
- providing a first data storage location and a second data storage location, the first data storage location having an appreciably faster access speed than the second data storage location, wherein the first and second data storage locations are primary storage locations that provide persistent storage;
- accessing a score associated with the data item, the score being calculated by a computer device based on a frequency of access of the data item;
- selecting only one of the first data storage location or the second data storage location based on a value of the score associated with the data item with respect to scores of other data items being stored, wherein the data item is stored in only one of the first data storage location or the second data storage location at any point in time;
- periodically re-calculating the scores associated with the data items in a table, wherein the score is accessed from a score table of data items; and
- in response to the re-calculating of the scores, causing a change in the selecting of the one of the first data storage location or the second data storage location, removing the data item from a current storage location and adding the removed data item to a newly selected storage location.

14. The computer program of claim 13, further comprising a second data item having a second data score that is lower than the score of the data item, wherein the selecting selects the first data storage location for the data item and the second data storage location for the second data item.

15. The computer program of claim 13, wherein the score is further calculated based at least one of: on an amount of time that a data item remains open, a size of the data item, a percentage of the data item that is accessed or a type of data in the data item.

16. The computer program of claim 13, wherein the score table of data items includes an identifier of the data item, a size of the data item, the score, a timestamp indicating when the score was calculated and an identifier that indicates whether the data item is currently stored on the first data storage location or the second data storage location.

17. The computer program of claim 16, wherein the periodically re-calculating of the scores associated with the data items in the table is performed by diminishing the score of each of the data items by different amounts that are based on a period of time having elapsed for each of the data items since a previous access of a particular data item.

18. The computer program of claim 17, further comprising, in response to the re-calculating of the scores causing a change in the selecting of the one of the first data storage location or the second data storage location, removing the data item from a current storage location and adding the data item to a newly selected storage location.

19. A method of generating a computer system for determining a storage location for a data item, the method comprising:
- providing a computer system configured to:
- provide a first data storage location and a second data storage location, the first data storage location having an appreciably faster access speed than the second data storage location, wherein the first and second data storage locations are primary storage locations that provide persistent storage;
- access a score associated with the data item, the score being calculated by a computer device based on a frequency of access of the data item;
- select only one of the first data storage location or the second data storage location based on a value of the score associated with the data item with respect to scores of other data items being stored, wherein the data item is stored in only one of the first data storage location or the second data storage location at any point in time;

periodically re-calculate the scores associated with the data items in a table, wherein the score is accessed from a score table of data items; and in response to the re-calculating of the scores, cause a change in the selecting of the one of the first data storage location or the second data storage location, removing the data item from a current storage location and adding the removed data item to a newly selected storage location.

20. The method of claim 19, wherein the computer system is further operable to:
calculate the score, further based on at least one of:
an amount of time that a data item remains open,
a size of the data item,
a percentage of the data item that is accessed, or
a type of data in the data item.

* * * * *